United States Patent [19]
Coskun

[11] Patent Number: 5,764,958
[45] Date of Patent: Jun. 9, 1998

[54] METHOD AND APPARATUS FOR CREATING DYNAMIC ROLES WITH A SYSTEM OBJECT MODEL

[75] Inventor: Nurcan Coskun, Austin, Tex.

[73] Assignee: International Business Machines Corporation, Armonk, N.Y.

[21] Appl. No.: 565,374

[22] Filed: Nov. 30, 1995

[51] Int. Cl.⁶ .................................................. G06C 21/00
[52] U.S. Cl. ........................ 395/500; 395/614; 395/683
[58] Field of Search ..................... 395/500, 800, 395/335, 702, 707, 685, 708, 614, 683

[56] References Cited

U.S. PATENT DOCUMENTS

| | | | |
|---|---|---|---|
| 5,361,350 | 11/1994 | Conner et al. | |
| 5,418,964 | 5/1995 | Conner et al. | 395/685 |
| 5,421,016 | 5/1995 | Conner et al. | 395/707 |
| 5,428,792 | 6/1995 | Conner et al. | 395/708 |
| 5,493,680 | 2/1996 | Danforth | 395/702 |
| 5,555,365 | 9/1996 | Selby et al. | 395/335 |
| 5,613,148 | 3/1997 | Rezviner et al. | 395/800 |

OTHER PUBLICATIONS

An Efficient Database Storage Structure for Large Dynamic Objects, IEEE 1992.
Dynamic Object Models with Spatial Application, IEEE 1991.

*Primary Examiner*—Kevin J. Teska
*Assistant Examiner*—Dan Fiul
*Attorney, Agent, or Firm*—David A. Mims, Jr.

[57] ABSTRACT

A method and apparatus for providing dynamic roles for objects in an object-oriented programming environment. A mechanism adds roles dynamically for an object depending on the context of the object. The IBM System Object Model (SOM) is the principal building block for enabling this function. The dispatch resolution method of the System Object Model supports the functions of this invention. The dynamic objects are represented as list of objects where objects are added to the list at any time. For example, when an application program is started, a person object will only have a student object. Before calling a function requiring teacher characteristics, the teacher role is added to the person object. When the function call returns, the teacher role is deleted from the person object if the role is no longer needed.

9 Claims, 4 Drawing Sheets

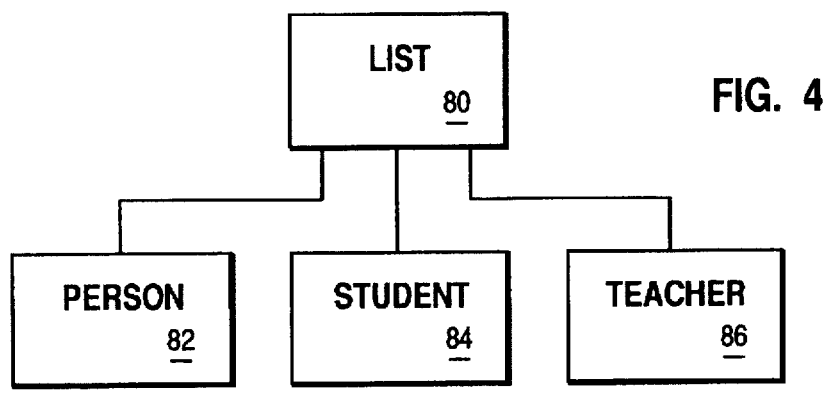
FIG. 4
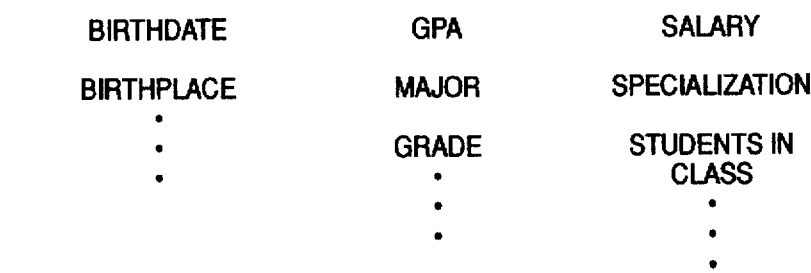
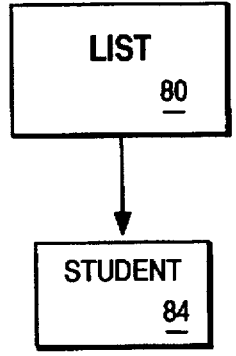
FIG. 5
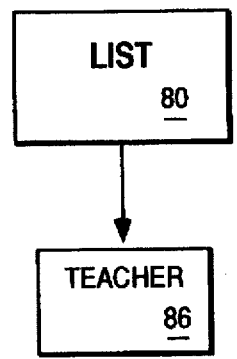
FIG. 6
FIG. 7
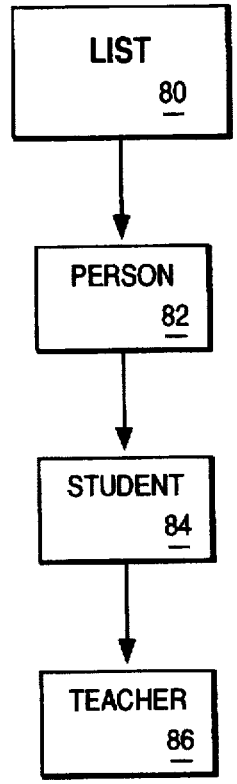
FIG. 8

METHOD AND APPARATUS FOR CREATING DYNAMIC ROLES WITH A SYSTEM OBJECT MODEL

FIELD OF THE INVENTION

The present invention relates to data processing systems, and more particularly, to providing dynamic objects for object-oriented programming applications in a System Object Model (SOM).

BACKGROUND OF THE INVENTION

After years of debate and discussion, object-oriented programming languages (or OOP) are becoming mainstream programming technologies. The OOP languages offer improved programmer productivity, reusable code, and easier maintenance. A central aspect of object-oriented programming models is called method resolution. This is the mechanism used to select a particular method given an object, the method's ID, and the arguments to the method. In some prior art object models, method resolution consists of determining an offset into an object's specific table of procedure entry points based on an analysis of the program's source code. These objects are referred to as static objects. Static objects do not allow a choice of which method to select during program execution. Static objects expect the choice of which method to execute for a particular method's ID, and a particular object to remain constant once program execution begins. While most static models allow the resolution to be preformed once, the selected method may be called repeatedly without going through resolution as long as the same object is to be used.

Another prior art object-oriented programming language offers a dynamic model which consists of using the name of the object to determine a specific method at runtime. In dynamic models, the choice of which method to select can change during the time of a program's execution. Unlike static objects, which allow a selected method for the same object to be called repeatedly without going through resolution, once resolution has occurred, dynamic models cannot perform such a procedure because the set of methods that a class overrides from it ancestor classes can change during a program's execution, thus changing the method that should result from resolution with a particular method's ID, and a particular object while the program is running.

In any case, static or dynamic objects must be capable of corresponding to different roles. For example, a person could represent a student, teacher, father, etc. In order to make the same entity have different responsibilities in different contexts, the prior art has use the object-oriented mechanism of multiple inheritance. Multiple inheritance represent objects as objects that inherits from different classes. Thus, objects are required to carry the overhead of their complexity in every context.

It is desirable to have a mechanism that can add roles to objects dynamically, depending on the context of the object while limiting the overhead requirements.

SUMMARY OF THE INVENTION

This invention relates to a method and apparatus for providing dynamic roles for objects in an object-oriented programming environment. A mechanism is provided that permits roles to be dynamically added for an object, depending on the context of the object which results in efficient programs. The IBM System Object Model (SOM) is the principal building block for providing this function. The IBM System Object Model implements three types of method resolution. The first is offset resolution which consists of determining an offset into an object specific table of procedure entry points based on an analysis of the program's source code. The second is dynamic resolution which consists of using the name of the object to determine a specific method at runtime. The third is dispatch resolution which is used to provide the functions of this invention. In dispatch resolution, method resolution is decided by the implementation of "somDispatch" methods. This invention overrides "somDispatch" methods in new classes to implement application specific dispatch mechanism. Dynamic objects are represented as lists of objects. Objects are added to the list at any time. For example, when a program is started, a person object will only have a student object. Before calling a function requiring teacher characteristics, a teacher role is added to the person object. When the function call returns, the teacher role is deleted from the person object if the role is no longer needed.

In summary, dynamic roles objects are associated with a role list object. Methods are provided to add a role to an object or delete a role. This is achieved by overriding the somDISPATCH method. The procedure searches for all objects in the role object list to find the first one having the needed method.

BRIEF DESCRIPTION OF THE DRAWINGS

FIGS. 4–8 are block diagrams of a list object with dynamic role objects of this invention.

DETAILED DESCRIPTION OF THE EMBODIMENTS

Figure 1:
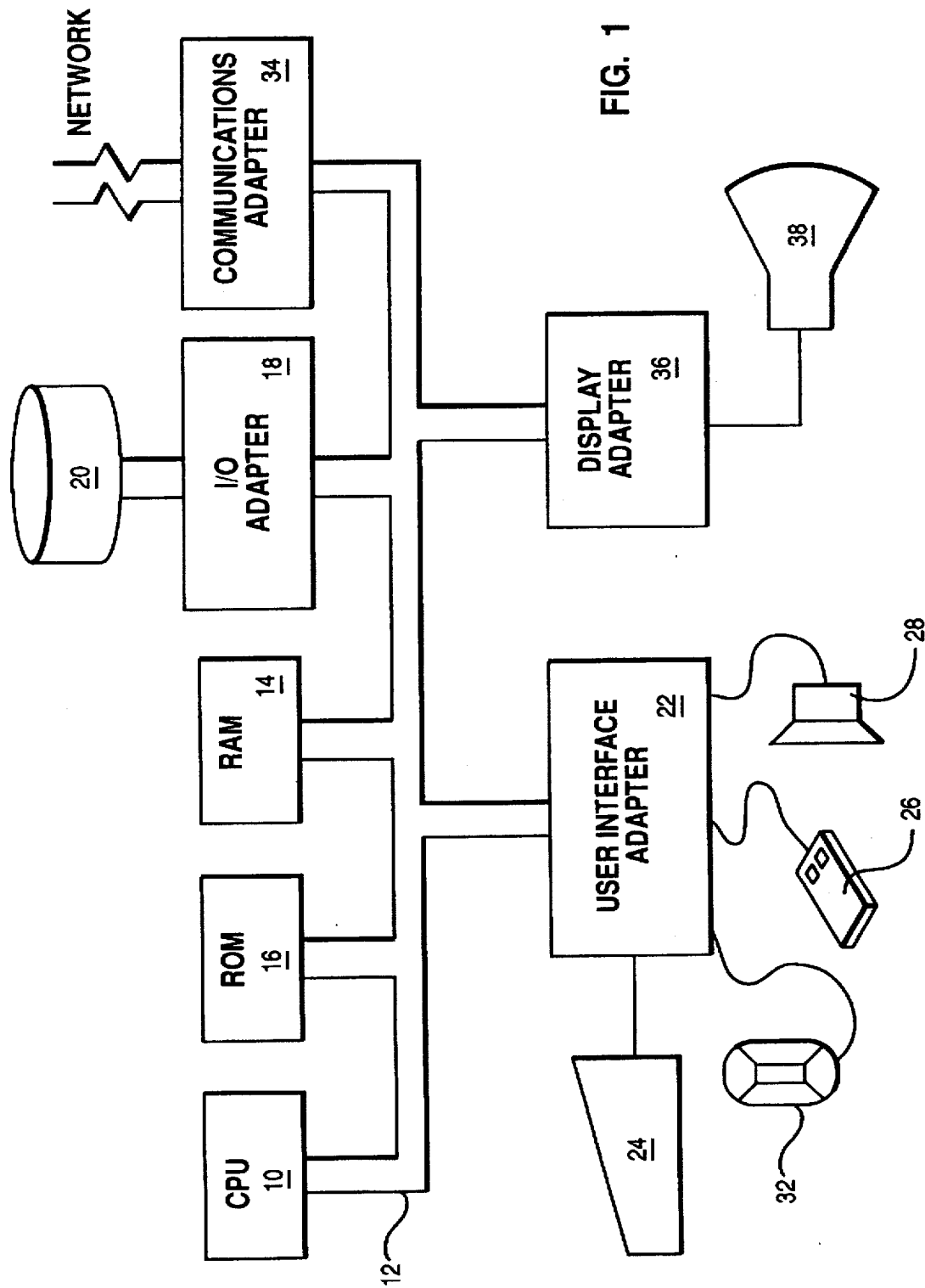
FIG. 1 is a block diagram representation of a computer/workstation where the invention may be practiced.

This invention provides a method and apparatus for creating dynamic roles for objects in an object-oriented programming environment. The invention is preferably practiced in the context of an operating system resident on an IBM PS/2 computer available from the IBM Corporation. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18, for connecting peripheral devices such as disk unit 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36, for connecting the bus to a display device 38. The workstation, in the preferred embodiment, has resident thereon the OS/2 operating system, and the computer software making up this invention which is included as a toolkit.

Figure 2:
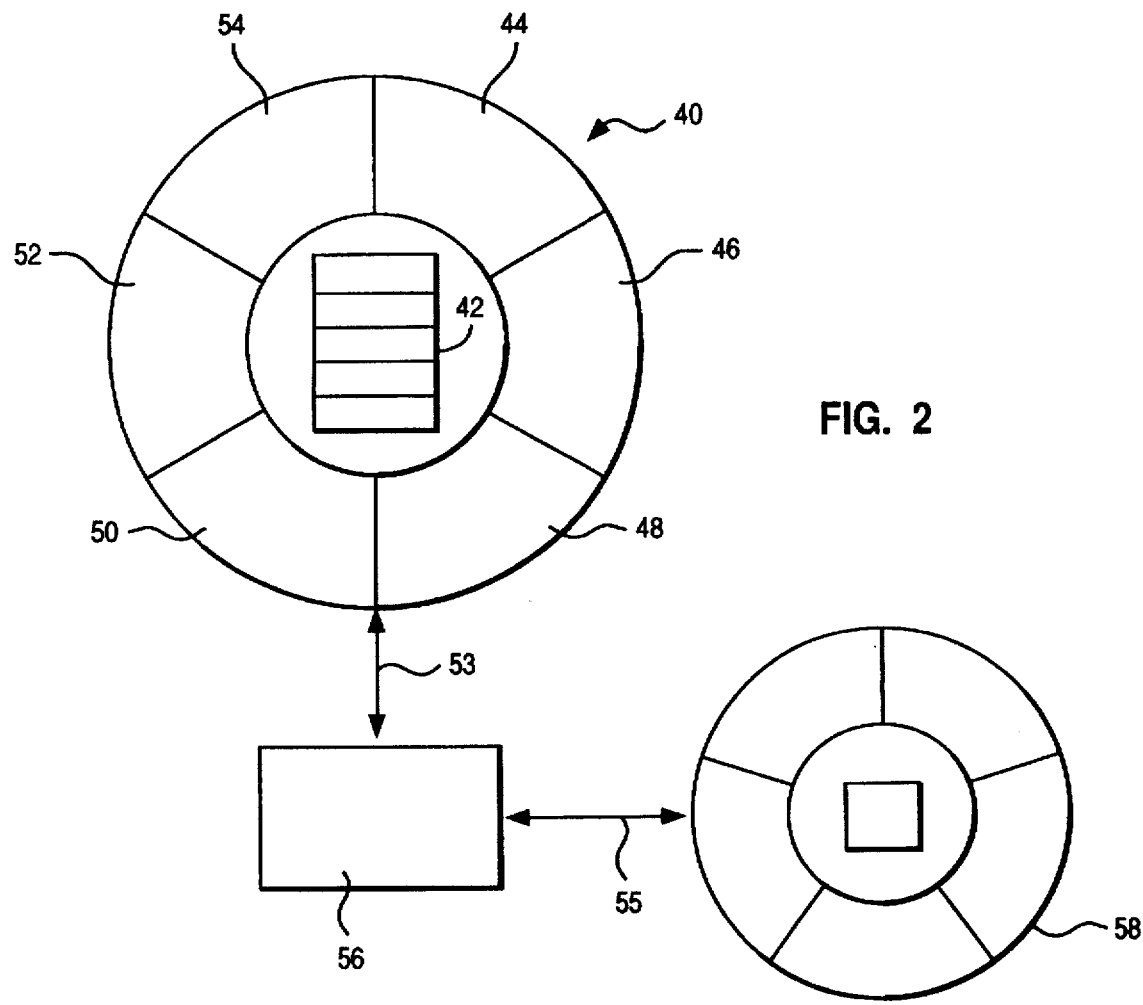
FIG. 2 is an object in an object-oriented environment.

With reference to FIG. 2, a diagram of objects in an object oriented system is depicted in accordance with a preferred embodiment of the present invention. An object encapsulates data and the methods needed to operate on that data. Objects can be represented by a "doughnut diagram" such as shown in FIG. 2. Object data 42 is shown in the center of the doughnut surrounded by the applicable methods 44 through 54. Data 42, may be modified only by the methods of that object. Methods 44-54 are invoked by receiving messages from other objects. A typical object oriented system will have a message router 56, that routes messages between objects. Thus, object 58 causes Method 48, to be invoked by sending a message 55, to message router 56, that in turn sends message 53, to Method 48 of object 40. An object, as used in this invention, has the properties of encapsulation, inheritance, and polymorphism. Encapsulation refers to the hiding of an object's implementation details. Inheritance refers to a technique of specifying the shape and behavior of a class of objects, called a derived class, or a subclass, as incremental differences from another class, called a parent class or superclass. Polymorphism refers to the ability to hide different implementations behind a common interface, simplifying the communications among the objects.

Objects are grouped into classes of related objects. The class description contains information relevant to all objects in a class, including a description of instance variables maintained by each of the objects and the available object methods. An object instance is created (or "instantiated"), based on that information and has the properties defined in the object class. For example, the object class DOG, can include the instance variables "dog_type", and "dog_name", and a "bark" method implementing the response to a bark message. An instance of dog, e.g., Rover, will maintain the type and name instance variables for itself and will respond to the bark message.

Abstract classes are used to describe the interfaces and methods expected to be used by a class without providing details on the implementation of those methods. Abstract classes are useful where the implementation details are to be left to the implementor. Concrete classes are created as subclasses of abstract classes and implement those classes.

Figure 3:
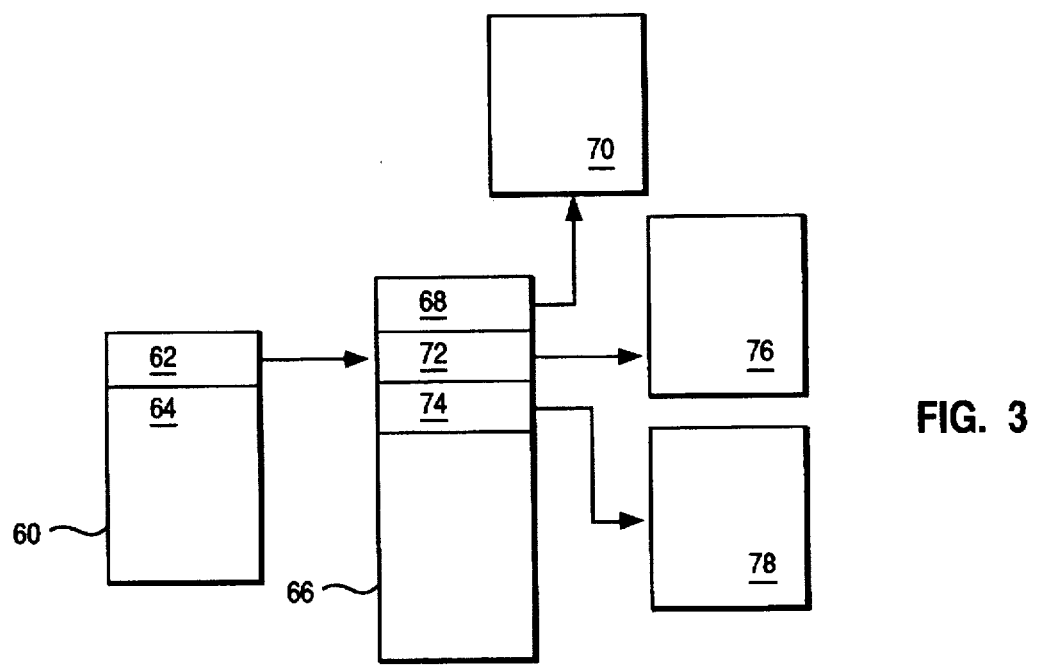
FIG. 3 is a block diagram of a System Object Model (SOM) data structure in an object-oriented environment.

With reference to FIG. 3, there is shown a basic SOM data structure. A state data structure 60, for a particular object is shown where the first full word 62, contains the address of the object's method procedure table 66. The method procedure table 66, contains the address of the class object data structure 68, and addresses of various methods for the particular object 72 and 74. The address 68, points to the class object data structure 70. All objects that are of the same class as this object also contain an address that points to this method procedure table 66. Any methods inherited by the objects will have their method procedure addresses at the same offset in memory as they appear in the method procedure table 66, of the ancestor class. Addresses of the blocks of computer memory containing the series of instructions for two of the method procedures are set forth at 72 and 74. Locations 76 and 78, are in computer memory and contains the series of instructions of a particular method procedures pointed to by the addresses at 72 and 74. A complete description of the IBM System Object Model can be found in IBM docket AT9-91-072, Ser. No. 07/805,778, U.S. Pat. No. 5,421,016, entitled "System and Method for Dynamically Invoking Object Methods from an Application Designed for Static Method Invocation", which is incorporated herein by reference.

Turning now to FIG. 4, there is shown a block diagram using a list to add/delete roles to a dynamic object. The list object 80, contains pointers to SOM objects representing a person object 82, student object 84, and a teacher object 86. The invention describes a technique that can add roles to the object dynamically, depending on the context. The person object 82 may contain information on a particular individual including the birth date, birth place, name, etc. The student object 84, contains specific information on a student including grade point average (GPA), major, grade for a particular class, etc. The teacher object 86, contains particular information on a teacher including salary, specialization, students in class, etc. One skilled in the art will appreciate that any number of dynamic objects with various roles can be added to the list object 80.

Turning now to FIGS. 5-8, the technique for accessing the list object containing the dynamic role objects will be described. When an application program is started, for example, which requires all the people born in Austin, Texas, only the person object 82 is required. As shown in FIG. 5, the list object 80, will be searched and only the person object will be loaded. Likewise, if the application program is required to calculate all the students with a GPA of 4.0, the list object 80, will be searched as shown in FIG. 6, and only the student object 84, will be loaded. In the same way, an application program that seeks all teachers teaching Math, will search the list object 80, in FIG. 7, and load only the teacher object 86. All of the dynamic object will be loaded when an application is called upon to find all the teachers who are teaching Math, and who are also taking a history class, and who are younger then 50 years old. As shown in FIG. 8, the list object 80, will be searched and the person object 82, student object 84, and teacher object 86, will be loaded. Returning to FIG. 4, it will be apparent to those skilled in the art that given a list object 80, additional dynamic objects (e.g., 82, 84, 86) containing roles can be added to the list object 80, at any time. It will also be apparent to those skilled in the art that when an application program is started requiring only the person object 82, and later requires teacher characteristics, the teacher object 86, may be loaded, and when the function call returns, the teacher object 86, may be deleted if no longer needed.

Figure 9:
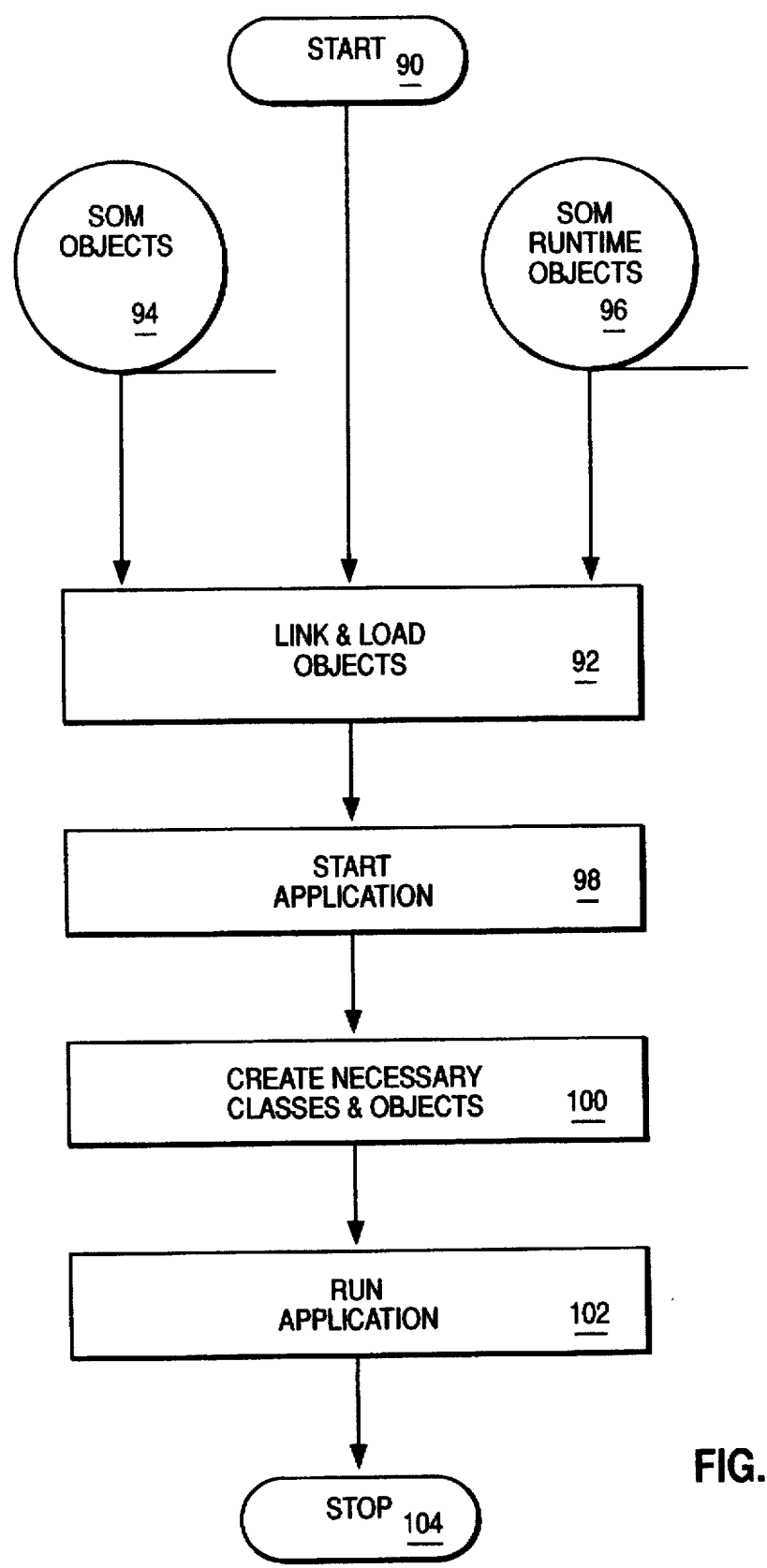
FIG. 9 is a flow diagram of an application using the dynamic role objects of the invention.

Turning to FIG. 9, there is shown a flow diagram for executing the dynamic role objects of the invention. The invention allows an application to invoke the dynamic role objects. Dynamic invocation refers to the ability of a program to determine the method to call at run time and not when the application is compiled. Dynamic resolution systems require run time information to accurately resolve the method call. As illustrated in FIG. 9, an application using the SOM dynamic role objects of the invention commences processing at block 90 and proceeds to block 92. At block 92, the procedure performs a dynamic link and load of the dynamic SOM objects 94, based on the list object of FIG. 5, and the SOM run time library 96. At block 98, the application is started, which invokes the creation of necessary classes and objects as set forth in function block 100. Finally, the application is executed as shown in function block 102 and control is terminated at terminal block 104.

While the invention has been described with respect to a preferred embodiment thereof, it will be understood by those skilled in the art that various changes in detail may be made therein without departing form the spirit, scope, and teaching of the invention. Accordingly, the herein disclosed invention is to be limited only as specified in the following claims.

What we claim is:

1. A method, implemented in a computer system, for creating a dynamic object in an object-oriented environment, comprising the steps of:

creating a list object having a plurality of role objects in said computer system in said object-oriented environment;

associating a system object model having a plurality of method resolutions with said list object; and specifying discrete information within each of said plurality of role objects to create a dynamic object accessible through said plurality of method resolutions in said system object model.

2. The method of claim 1, further comprising the steps of:

determining that one of said plurality of role objects contains specific discrete information required in an application program in said computer system in said object-oriented environment;

searching said list object in said computer system for said dynamic object; and executing said one of said plurality of role objects using one of said plurality of method resolutions in said system object model.

3. An apparatus for creating a dynamic object in an object-oriented environment, comprising:

means for creating a list object having a plurality of role objects in said computer system in said object-oriented environment;

means for associating a system object model having a plurality of method resolutions with said list object; and means for specifying discrete information within each of said plurality of role objects to create a dynamic object accessible through said plurality of method resolutions in said system object model.

4. The apparatus of claim 3, further comprising:

means for determining that one of said plurality of role objects contains specific discrete information required in an application program in said computer system in said object-oriented environment;

means for searching said list object in said computer system for said dynamic object; and means for executing said one of said plurality of role objects using one of said plurality of method resolutions in said system object model.

5. A computer program product having a computer readable medium having computer program logic recorded thereon for creating a dynamic object in an object-oriented environment, comprising:

computer readable medium for creating a list object having a plurality of role objects in said computer in said object-oriented environment;

computer readable medium for associating a system object model having a plurality of method resolutions with said list object; and computer readable medium for specifying discrete information within each of said plurality of role objects to create a dynamic object accessible through said plurality of method resolutions in said system object model.

6. The computer program of claim 5 comprising:

computer readable medium for determining that one of said plurality of role objects contains specific discrete information required in an application program in said computer system in said object-oriented environment; and computer readable medium for searching said list object in said computer system for said dynamic object.

7. A method implemented in a computer system for accessing a dynamic object in an object oriented environment, comprising:

creating a system object model in said computer system having a plurality of method resolutions;

creating a list object associated with said system object model in said object oriented environment; and creating a dynamic role object in said computer system associated with said list object in said object oriented environment specifying a plurality of roles.

8. The method of claim 7 further comprising:

determining that an application program in said object oriented environment requires an indicated one of said plurality of roles in said dynamic role object;

searching said list object for said indicated one of said plurality of roles in said role object and executing said one of said plurality of roles using one of said plurality of method resolutions in said system object model.

9. The method of claim 7 wherein said one of said method resolutions is dispatch resolution.

* * * * *